METHOD AND MEANS FOR TRANSMITTING INTELLIGENCE

Filed Sept. 5, 1942 3 Sheets-Sheet 1

INVENTOR
NORMAN H. YOUNG, JR.
BY
ATTORNEY

July 14, 1953 N. H. YOUNG, JR 2,645,677

METHOD AND MEANS FOR TRANSMITTING INTELLIGENCE

Filed Sept. 5, 1942 3 Sheets-Sheet 2

INVENTOR
NORMAN H. YOUNG, JR.
BY
ATTORNEY

INVENTOR
NORMAN H. YOUNG, JR.
BY [signature]
ATTORNEY

Patented July 14, 1953

2,645,677

UNITED STATES PATENT OFFICE 2,645,677

METHOD AND MEANS FOR TRANSMITTING INTELLIGENCE

Norman H. Young, Jr., Jackson Heights, N. Y., assignor to Federal Telephone and Radio Corporation, a corporation of Delaware Application September 5, 1942, Serial No. 457,407

13 Claims. (Cl. 178—5.1)

This invention relates to improvements in methods and means for transmitting intelligence, and more particularly to a system for transmitting intelligence in connection with the simultaneous transmission of jamming pulses.

An object of this invention is to provide a method and means for transmitting intelligence, which will be difficult of detection by unauthorized or enemy receivers.

Another object of this invention is to provide a system which utilizes the transmission of a jamming signal to assist in the transmission of a desired intelligence.

A more specific object of this invention is to provide a system in which jamming signals are used to synchronize the transmission and reception of intelligence.

These and other objects will be apparent from the following description and appended claims when taken in connection with the drawings, wherein:

Figure 1:
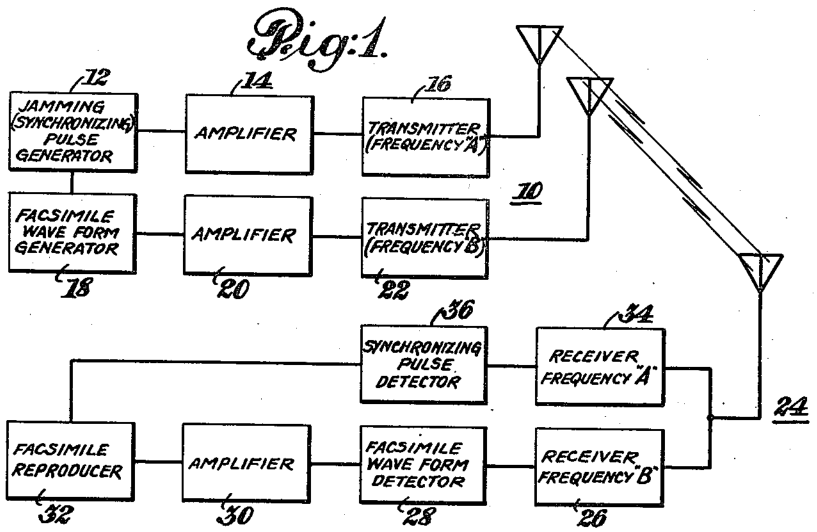
Fig. 1 is a block circuit diagram of a preferred form of intelligence transmission system in accordance with the present invention.

The form of invention as illustrated in Fig. 1 will include a transmitter 10 consisting of a jamming pulse generator 12 which is connected through a suitable amplifier 14 to a transmitter 16 transmitting at some predetermined frequency "A," and a facsimile waveform generator 18 connected through a suitable amplifier 20 to a second transmitter 22, transmitting at a second predetermined frequency "B." The receiving station 24 will include a suitable receiver 26 tuned to the frequency "B," to which is connected the facsimile waveform detector 28 which, through a suitable amplifier 30, operates a facsimile reproducer 32. The receiving station 24 will also include a receiver 34 tuned to frequency "A," to which is connected a pulse detector 36.

In accordance with the present invention it is proposed that the pulse generator 12 produce a series of spaced jamming pulses at predetermined intervals for the purpose of jamming the signals of some desired station. Coordinated with the pulse generator 12 by any suitable means (not shown) is a facsimile waveform generator of any known type, but preferably a generator which is capable of scanning and reproducing a desired message in a very short space of time. Such a system is known in the art as "high speed facsimile." The relationship between the spaced jamming pulses produced by the generator 12 and the high speed facsimile generator 18 is preferably such that the facsimile waveform generator can reproduce at least one line of a message to be transmitted between the jamming pulses produced by the generator 12. This relationship between the jamming pulses and the facsimile waveform is more clearly indicated in Fig. 2 in which line (a) shows the spaced jamming pulses 38 being transmitted at frequency "A," while line (b) shows the facsimile waveforms 40 transmitted at frequency "B" during the interval between jamming pulses 38. In order to prevent wasteful operation of the reproducer 32, the waveform generator 18 may also include well-known means for producing some suitable, known triggering signal before the intelligence is to be transmitted. Such signal will be sent over the same channel as the facsimile waveform will prepare the reproducer 32. An example of such a triggering signal is indicated in Fig. 2 at 41, in front of the facsimile waveform 40.

The system preferably operates in the following manner: Over a desired predetermined period of time the transmitter 16 will continually send out the spaced jamming pulses 38, while the transmitter 22 will not be operative. These pulses transmitted from 16 on frequency "A" may serve to jam enemy signals or, in any event, serve to give the impression of jamming, and at the same time will keep the receiving apparatus at the station 24 in proper synchronism. Accordingly, when the transmitter 22 sends out the desired message at frequency "B" the station 24 will be properly conditioned to receive it. Since it is proposed to use a high speed facsimile system for the transmission of the desired intelligence and the entire message can be sent, for example, in one or two seconds, and will be on a different frequency than the jamming synchronizing pulse, interception and proper interpretation of the transmitted intelligence will be most difficult.

It is possible to increase the difficulty of interception and interpretation of the transmitted intelligence if, in addition to the transmission of spaced jamming pulses 38 on frequency "A," jamming pulse generator 12 also produces random pulses 42 (Fig. 2) between the spaced pulses 38. The addition of such random pulses to the regular spaced pulses will not only increase the jamming effect but, unless the enemy receiver knows the frequency of the regular pulses, it will be impossible to utilize the jamming signal for synchronization with the intelligence transmitter. However, the intended receiving station 24, knowing the frequency of the synchronizing jamming pulses, can be provided with suitable filter circuits to pass the spaced pulses 38 only and use them for synchronizing purposes.

Figure 2:
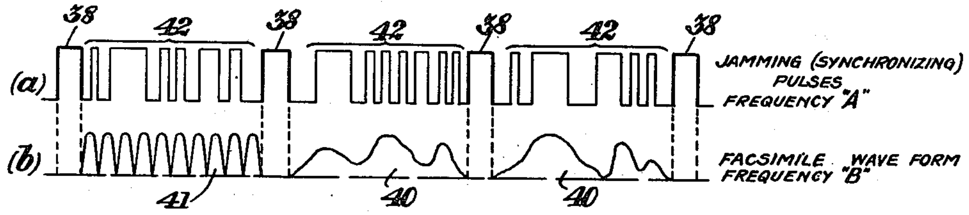
Fig. 2 illustrates an example of jamming pulses and facsimile waveform which may be used in connection with the system illustrated in Fig. 1.

Instead of providing single spaced synchronizing jamming pulses 38 as illustrated in Fig. 2, it is, of course, equally possible to provide a series of jamming pulses 38' at predetermined intervals. In this case the intervals between groups of pulses 38' may, perhaps, be made somewhat larger than between the individual pulses 38. Again, in order to increase the difficulty of detection the pulse generator may also provide a series of random jamming pulses 42' between the series of regular jamming pulses 38'.

Figure 4:
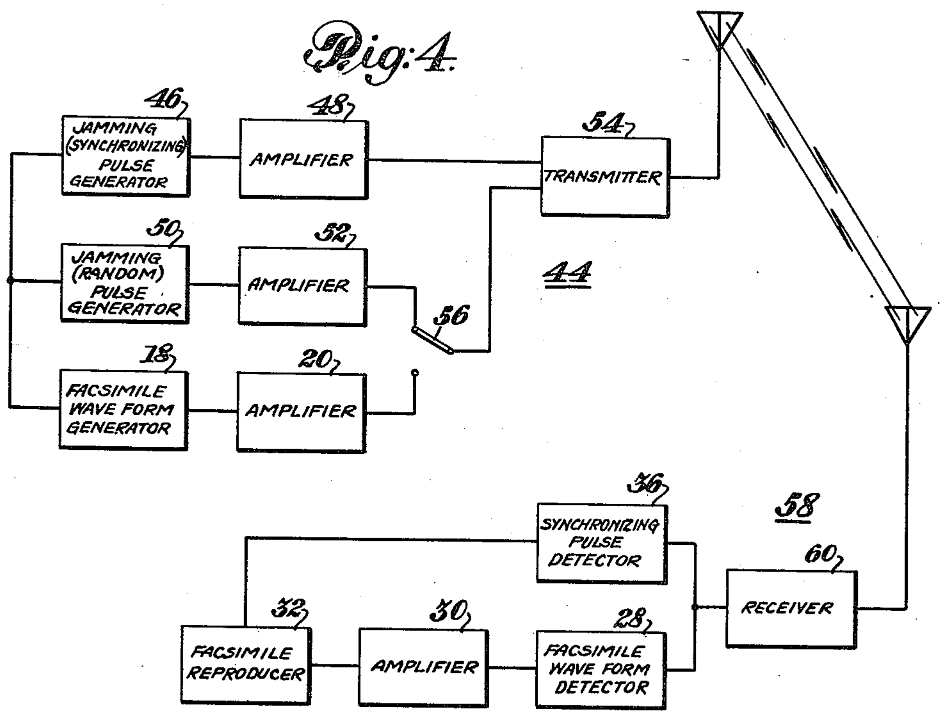
Fig. 4 is a block circuit diagram of a modified form of invention.
Figure 5:
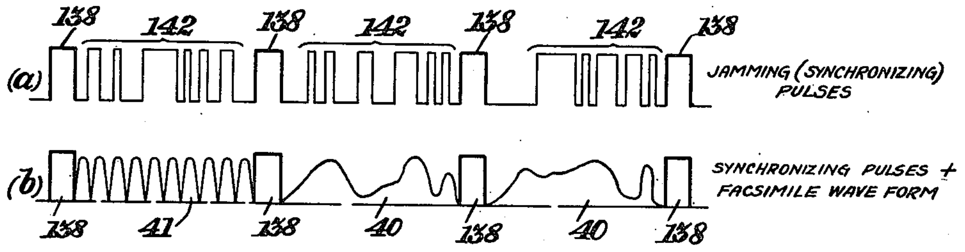
Fig. 5 illustrates an example of jamming pulses and facsimile waveform which may be used in connection with the circuit illustrated in Fig. 4.

A second form of the invention utilizing the basic principles previously described in connection with Fig. 1 but transmitting both the jamming pulses and the facsimile waveform from a single transmitter on the same wavelength is illustrated in Fig. 4. In this form of invention the transmitting station 44 is preferably provided with a jamming, synchronizing pulse generator 46 with its suitable amplifier 48, a jamming random pulse generator 50 with its amplifier 52 and a facsimile waveform generator 18 and amplifier 20 which may be identical with those used in the system illustrated in Fig. 1. The pulse generator 46 is, during a desired period, connected to the transmitter 54 and will produce a series of regularly spaced jamming pulses. During the times when no message is to be transmitted (and this, in accordance with the present invention, is intended to mean most of the time while the transmitter 54 is operating), the random pulse generator 50, properly synchronized with the pulse generator 46, will also be connected to the transmitter 54 and will provide random jamming pulses between the regular pulses from the generator 46. When it is desired to transmit a message the random pulse generator 50 will be disconnected and substantially simultaneously the facsimile waveform generator which is also synchronized with the pulse generator 46 will be connected to the transmitter 54. Suitable switching means indicated at 56 may be used for alternatively connecting the generators 50 and 18 to the transmitter. The receiving station 58 will include receiving apparatus 60, a detector 36 for separating the spaced synchronizing pulses from the random pulses, facsimile waveform detector 28, amplifier 30 and facsimile reproducer 32, the operation of which will be synchronized by the separate synchronizing pulses. The types of waves transmitted from 54 are indicated in Fig. 5 in which (*a*) illustrates synchronizing pulses 138 between which are found random pulses 142, this being the transmission when the generators 46 and 50 are both connected to transmitter 54. During the period the message is to be sent, the transmitter will receive the synchronizing pulses 138 and triggering signal 41 followed by the facsimile waveform 40 as shown at (*b*).

Figure 3:
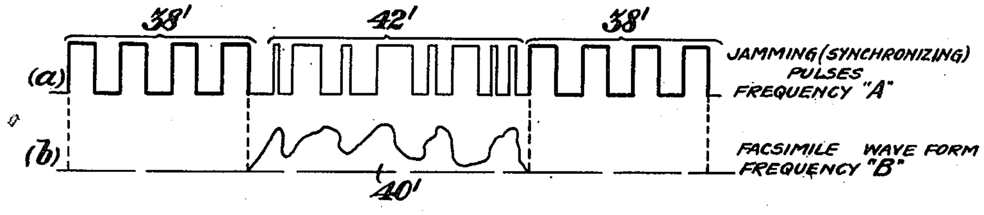
Fig. 3 illustrates an example of modified jamming pulses and facsimile waveform which may be used.

It will, of course, be understood that instead of using single spaced synchronizing pulses as just described, the system illustrated in Fig. 4 may produce spaced series of jamming pulses of the type illustrated in Fig. 3.

The system illustrated in Fig. 4 will operate similarly to that described in connection with Fig. 1 in that over a certain predetermined period the transmitter will send out the synchronizing pulses 138 interspersed with random pulses 142. For the short predetermined period during which it is desired to transmit intelligence, the random pulses 142 will be cut out and the facsimile waveform transmitted in their place. In this form of the invention, however, both the jamming pulses and the intelligence are transmitted at the same frequency. However, it will be still extremely difficult for an enemy receiver to detect and separate the synchronizing pulses 138 from the random pulses 142 and, if rapid facsimile is used the entire message to be transmitted will extend over such a short period of time, as compared with the time during which the jamming pulses are transmitted, that proper interception and reproduction of these messages will be most difficult. The authorized receiver, however, whose reproducer will at all times be synchronized by the jamming pulses 138, will receive and reproduce the desired message without difficulty.

Figure 6:
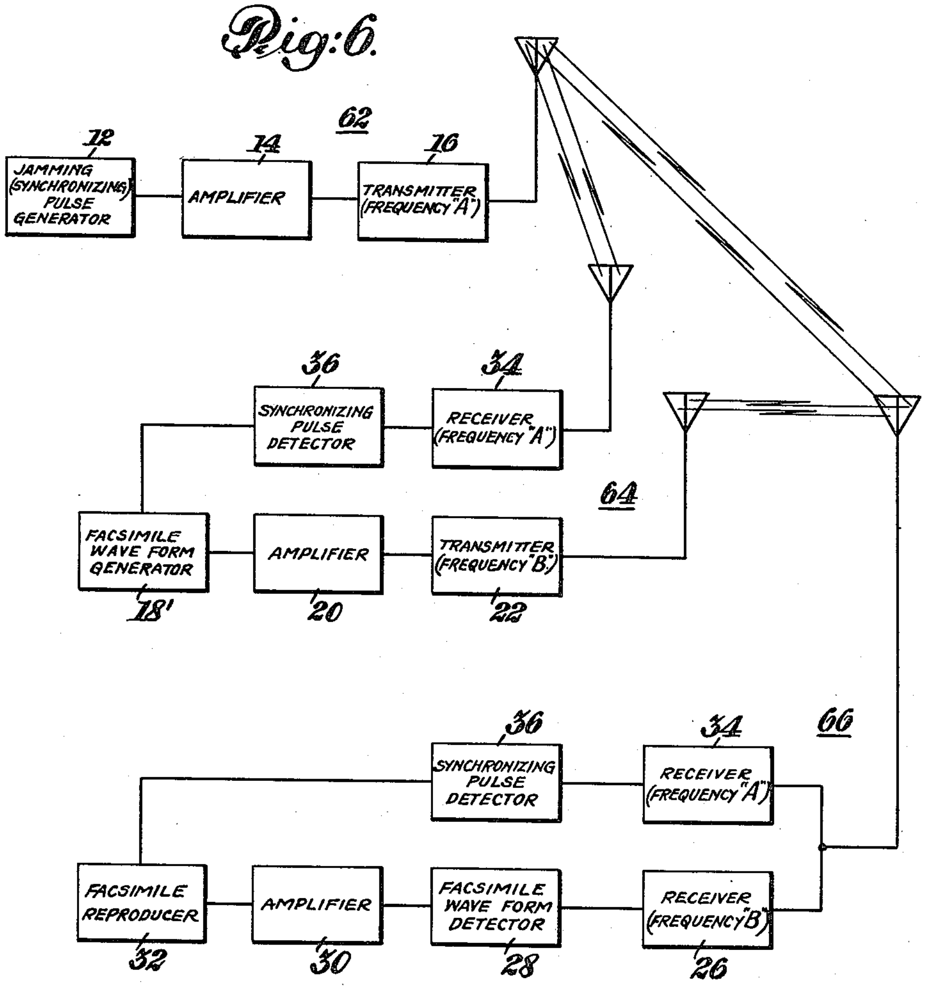
Fig. 6 is a block circuit diagram of still another modified form of the present invention.

An extension of the present system which makes it adaptable for the transmission of intelligence within enemy-held territory and at the same time makes for difficulty in the location of the transmitter, is illustrated in Fig. 6. This system uses a transmitter 62 which, for example, may be located in friendly territory, a second combined receiver and transmitter 64 which may be located in enemy-held territory and a receiver or receivers 66 also located in enemy-held territory. In this form of invention the transmitter 62 in friendly territory will be provided solely with a pulse generator 12 connected through a suitable amplifier 14, to a transmitter 16 transmitting at a certain frequency "A." The station 62 will transmit nothing but jamming pulses which will include synchronized pulses and, if desired, random jamming pulses in the manner described in connection with the system illustrated in Fig. 1. The station 64 in enemy-held territory will include a receiver 34 and a sychronizing pulse detector 36 which will receive the transmission of station 62 and separate the synchronizing pulses to synchronize a facsimile waveform generator 18'. The latter, in turn, is connected through a suitable amplifier 20 to a transmitter 22 operating at frequency "B." The receiver or receivers 66 in enemy-held territory will be substantially identical with the receiver 24 in Fig. 1, but in this case will receive the desired synchronizing pulse from the station 62 and the desired intelligence from the station 64. The advantages of this system will, at once, be apparent to those skilled in this art. The station 62 will operate to send out the jamming pulses, including the synchronizing pulses over a relatively long period of time. Identification and location of the station 62 will be relatively unimportant since it is in friendly territory. Station 64 in enemy-held territory and the location of which it is desired to maintain secret will continually receive and segregate the synchronizing pulses from the station 62 but will be silent except during the extremely short interval during which a message is to be transmitted by rapid facsimile. In other words, the station 62 might be transmitting for an hour, where as the time required for the transmission of the intelligence from the station 64 might only require a few seconds and would, therefore, be most difficult to locate. The receiver 66, however, will have no difficulty in receiving the desired message, since its reproducer will be always synchronized by the pulses received from the station 62. Assuming the stations 62, 64 and 66 are at fixed locations there will be no difficulty in properly aligning the reception of the pulses from station 62 with the reception of the message from station 64.

It is also possible that the jamming pulses from station 62 and the intelligence transmitted from station 64 be transmitted on the same instead of different wavelengths. In this event, the station 62 would only transmit spaced jamming pulses and would not transmit the random jamming pulses. The advantage in both stations transmitting on the same wavelength would be that the location of the transmitter 64 would be still more difficult to detect. In the event of a possible misphasing between the synchronizing jamming pulses and the facsimile wave at the station 66, such could be corrected.

While the jamming pulses illustrated in connection with the present invention have been shown as rectangular pulses, any type of pulse may be used provided it has one abrupt edge which may be used for synchronizing purposes. An example of such a pulse would be a sawtooth pulse.

Details of the apparatus to be used in accordance with my proposed invention have not been given as they are deemed unnecessary to those skilled in this art. These details are wholly unimportant as various types of individual apparatus which are known and are available, may be utilized. Accordingly, I do not intend that the invention be limited except as set forth in the claims which follow.

What I claim is:

1. The method of transmitting intelligence, which includes the steps of transmitting a plurality of jamming pulses at spaced predetermined intervals over a certain period of time, synchronizing a facsimile receiver by means of said jamming pulses, transmitting random jamming pulses between the synchronizing jamming pulses and transmitting intelligence to said receiver by rapid facsimile between some of said jamming pulses.

2. An intelligence transmission system including, in combination, means for generating jamming pulses at spaced predetermined intervals of time, means for generating random jamming pulses between said spaced jamming pulses, means for generating a desired facsimile waveform between said spaced jamming pulses, means for transmitting said spaced jamming pulses, said random jamming pulses and said facsimile waveform, means for receiving and reproducing said facsimile waveform, and means for synchronizing said facsimile waveform receiver and reproducer with said facsimile waveform generator transmitting means by said spaced jamming pulses.

3. The method of transmitting intelligence, which includes the steps of transmitting a plurality of jamming pulses at spaced predetermined intervals over a certain period of time and on a predetermined wavelength, transmitting random jamming pulses between said spaced jamming pulses on the same wavelength, synchronizing a facsimile receiver by means of said spaced jamming pulses, and transmitting intelligence to said receiver by rapid facsimile on a second wavelength between some of said spaced jamming pulses.

4. The combination according to claim 2, in which said transmitting means includes means for transmitting said spaced and random jamming pulses on one wavelength, and said facsimile waveform on another wavelength.

5. The method of transmitting intelligence, which includes the steps of transmitting a plurality of jamming pulses at spaced predetermined intervals over a certain period of time, synchronizing a random pulse generator and a rapid facsimile intelligence waveform generator with said spaced jamming pulses, synchronizing a rapid facsimile receiver and reproducer by means of said spaced jamming pulses, transmitting said random pulses between said spaced jamming pulses over the greater part of said time period, and transmitting the rapid facsimile intelligence to said receiver between said spaced jamming pulses during the remainder of said time period.

6. An intelligence transmission system including, in combination, means for generating jamming pulses at spaced predetermined intervals of time, means for generating random jamming pulses during the intervals between said spaced jamming pulses, means for generating a facsimile waveform corresponding to desired intelligence to be transmitted during the intervals between said spaced jamming pulses, a transmitter, means for connecting said spaced jamming pulse generator to said transmitter, means for alternatively connecting said random jamming pulse generator or said facsimile waveform generator to said transmitter, means for receiving said facsimile waveform, means for receiving said spaced jamming pulses, means for converting said facsimile waveform into the desired intelligence, and means operated by said spaced jamming pulses for synchronizing said facsimile waveform receiving means with the transmitted facsimile waveform.

7. The method of transmitting intelligence, which includes the steps of transmitting a plurality of jamming pulses at spaced predetermined intervals over a certain period of time, synchronizing a facsimile receiver by means of said jamming pulses, and transmitting intelligence to said receiver by rapid facsimile between some of said jamming pulses on a wavelength and from a location different from the wavelength and location of the jamming pulse transmitter.

8. The method of transmitting intelligence, which includes the steps of transmitting a plurality of jamming pulses at spaced predetermined intervals over a certain period of time, synchronizing a facsimile receiver by means of said jamming pulses, transmitting intelligence to said receiver by rapid facsimile between some of said jamming pulses on a wavelength and at a location different from the wavelength and location of the jamming pulse transmitter, and synchronizing the transmission of the rapid facsimile wave form at one transmitter with the transmission of the jamming pulses from the other transmitter.

9. The method according to claim 3, in which the jamming pulses and the rapid facsimile waveform are respectively transmitted from separately located transmitters.

10. The method according to claim 3, in which the jamming pulses and rapid facsimile waveform are transmitted on respectively different wavelengths from separately located transmitters.

11. An intelligence transmission system including, in combination, a first transmitting station, means for transmitting pulses at spaced predetermined intervals from said station, a second receiving and transmitting station located at a distance from said first station, means for transmitting a desired facsimile waveform corresponding to predetermined intelligence from said second station between said spaced jamming pulses, means for receiving said spaced jamming pulses at said second station, means for synchronizing the transmission of said facsimile waveform with said spaced jamming pulses, a third receiving station located at a distance from said first and second stations, said third station including means for receiving the spaced jamming pulses from said first station, means for receiving the facsimile waveform from said second station, means for synchronizing the received facsimile waveform with the transmitted facsimile waveform by said spaced jamming pulses, and means for reproducing the transmitted intelligence.

12. The combination according to claim 11, in which said first station transmits on one wavelength and said second station transmits on another wavelength.

13. The combination according to claim 11, in which said first station includes means for transmitting random jamming pulses between said spaced jamming pulses.

NORMAN H. YOUNG, Jr.

References Cited in the file of this patent

UNITED STATES PATENTS

| Number | Name | Date |
|---|---|---|
| 2,195,103 | Urtel | Mar. 26, 1940 |
| 2,204,050 | Purington | June 11, 1940 |
| 2,257,918 | Ressler | Oct. 7, 1941 |
| 2,275,249 | Cooley | Mar. 3, 1942 |

FOREIGN PATENTS

| Number | Country | Date |
|---|---|---|
| 288,714 | Great Britain | Apr. 12, 1928 |